(12) United States Patent
Jacques

(10) Patent No.: US 6,367,614 B1
(45) Date of Patent: Apr. 9, 2002

(54) MULTI-DIRECTION TRANSFER CONVEYOR

(75) Inventor: Roger A. Jacques, Rochester, NH (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/714,199

(22) Filed: Nov. 17, 2000

(51) Int. Cl.$^7$ .............................................. B65G 37/00
(52) U.S. Cl. ...................... 198/574; 198/586; 414/528
(58) Field of Search ................................ 198/574, 586; 414/528, 529, 539

(56) References Cited

U.S. PATENT DOCUMENTS

| | | |
|---|---|---|
| 2,236,103 A | 3/1941 | Lohner |
| 2,806,581 A | 9/1957 | Rees |
| 2,986,261 A * | 5/1961 | Wenstrand ............... 198/574 X |
| 3,561,625 A * | 2/1971 | Dioguardi ............... 198/574 X |
| 3,651,955 A | 3/1972 | Shkredka |
| 3,883,007 A | 5/1975 | Hirschboeck |
| 3,902,609 A | 9/1975 | Ohlsson |
| 4,679,977 A * | 7/1987 | Minami .................. 198/574 X |
| 5,324,158 A * | 6/1994 | Shah et al. ............. 198/574 X |
| 5,658,120 A | 8/1997 | Watanabe |
| 5,727,674 A * | 3/1998 | St. John et al. ......... 198/586 X |
| 5,992,186 A | 11/1999 | Fesmire |

* cited by examiner

Primary Examiner—Christopher P. Ellis
Assistant Examiner—Gene O. Crawford
(74) Attorney, Agent, or Firm—Nixon & Vanderhye PC

(57) ABSTRACT

A multi-direction transfer conveyor for off-loading a stack of paper from a first work station or conveyor, rotating the stack 90 degrees left or right and aligning the stack with a second conveyor, for example. Guide components which may be ball casters are provided on a bottom surface of the transfer conveyor cart to move within U-shaped channels that together form an L-shaped or U-shaped track. Drive wheels actuate the transfer conveyor to move along and/or relative to the shaped track. By suitable motor control and/or suitably placed or actuated stops and guide structures, travel of the guide components down the shaped track is controlled to cause the cart to rotate and align with the respective conveyors.

14 Claims, 9 Drawing Sheets

Fig.8

MULTI-DIRECTION TRANSFER CONVEYOR

BACKGROUND AND SUMMARY OF THE INVENTION

When off-loading stacks of paper from a cutter or the like onto a conveyor, there are installations where the output conveyor must be 90-degrees left or right rather than in-line. To accomplish this, the invention provides a 90-degree transfer conveyor for being disposed between processing components such as between an off-loading stacker and a job conveyor.

More particularly, the invention relates to a multi-direction transfer conveyor for receiving a stack of paper from a first work station or conveyor, rotating the stack 90 degrees left or right and aligning the stack with a second conveyor, for example. Guide components which may be wheels or ball casters provided on a bottom surface of the transfer conveyor are engaged with and confined to move within U-shaped channels that together form an L-shaped or U-shaped track. Drive wheel(s) actuate the transfer conveyor to move along and/or relative to the shaped track. By suitable motor control and/or suitably placed or actuated stops, travel of the guide components down the shaped track is controlled to cause the cart to rotate and align with the respective stations or conveyors.

DETAILED DESCRIPTION OF THE INVENTION

Figures 1, 2:
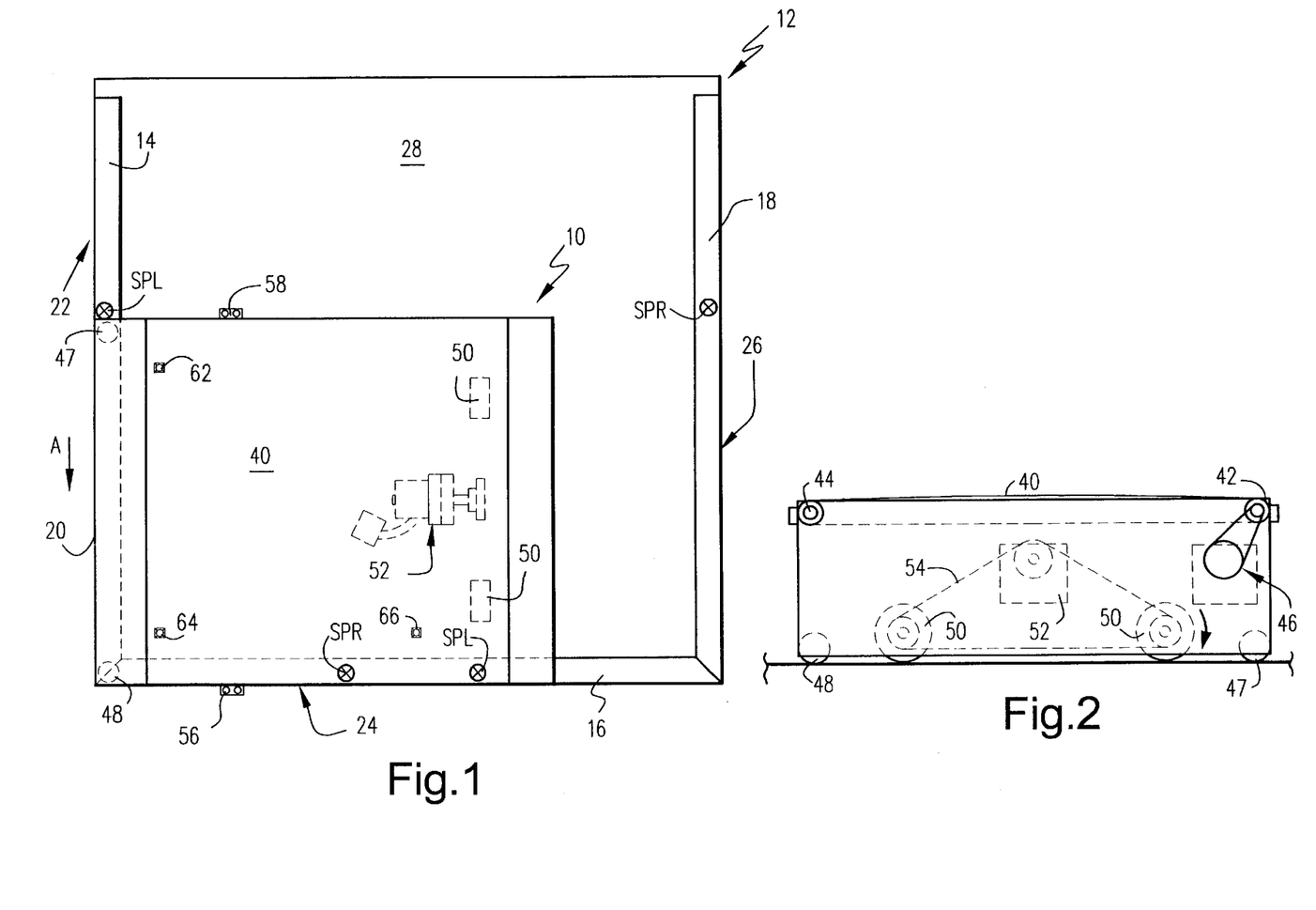
FIG. 1 is a schematic top plan view of a transfer conveyor disposed on a support structure in accordance with the invention.
FIG. 2 is a schematic side elevational view of the transfer conveyor of FIG. 1.
Figure 3:
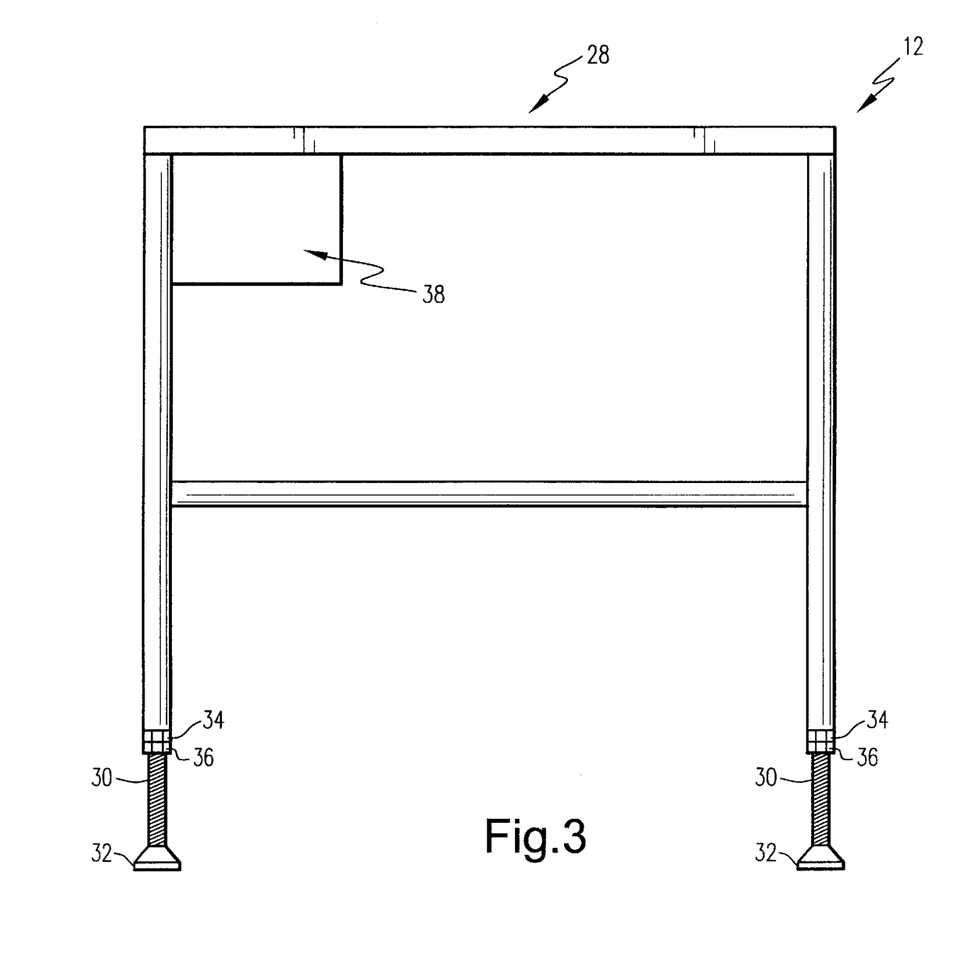
FIG. 3 is a schematic side view of an exemplary support stand or table for supporting the transfer conveyor and shaped channels in accordance with the invention.

Referring now to FIGS. 1 and 3, an exemplary transfer conveyor 10 embodying the invention disposed on a suitable stand or table 12 is schematically illustrated. To guide and control movement of the transfer conveyor 10, a plurality of U-channels 14,16,18 are provided about at least a portion of the periphery of the top surface of the stand to capture and guide one side 20 of the cart. For the transfer conveyor or cart (hereinafter referred to as a cart) to achieve a 90 degree turn operation, at least first and second U-channels are provided and intersect to define an L-shaped track that is generally U-shaped in vertical section to capture the cart guide components as discussed in greater detail below. For the stand to accommodate movement either 90 degrees right or 90 degrees left, U-channels are provided along three side edges 22,24,26 of the top surface 28 of the stand 12. With suitably disposed sensors and control logic, as discussed in greater detail below, U-shaped channels could be provided on all four sides of the top surface of the stand to define in effect a continuous U-channel about the periphery of the stand top surface.

As illustrated in FIG. 3, the cart support stand 12 is preferably height adjustable. In the illustrated embodiment, the stand includes threaded height adjustment legs 30, leveling pads 32, a fix nut 34 and a lock nut 36 to allow the height of the top surface 28 of the stand 12 and thus the height of the cart 10 to be adjusted and then locked. As described in greater detail below, the stand may also include suitable electrical components 38 for cart control.

With reference to FIGS. 1 and 2, the transfer conveyor cart is for example a belt type conveyor assembly provided with continuous belt 40, in the illustrated embodiment supported at one end by a drive roller 42 and at the other end by a free-rolling guide roller 44. A belt drive gear motor 46 is provided for driving the driven roller 42 in a conventional manner. In the illustrated embodiment, the belt is a 18"×18" continuous belt, although a series of belts having lesser widths, for example, may be disposed on the cart to define the conveyor surface thereof. Also, a conveying system other than a belt conveyor can be provided.

Guide components 47, 48, such as ball casters, are provided along one side edge 20 of the cart for being captured by the U-shaped channels 14,16,18 of the guide track to guide and determine the position of the cart 10 with respect to the top surface 28 of the support stand 12. In the presently preferred embodiment, the guide components 47, 48 are ball transfer rollers, e.g. ball casters, that ride inside U-shaped channels on the top of the stand.

The end of the cart opposite side 20 advantageously includes at least one drive wheel for driving the cart to rotate relative to the support stand. In the illustrated embodiment, a pair of drive wheels 50 are mounted inboard of the peripheral edge of the cart, so as to avoid undesired engagement with the U-channels, and are suitably driven by a cart drive gear motor 52 via a drive belt or chain 54, or the like. In the alternative to a pair of commonly driven drive wheels, as shown, the gear motor 52 may directly drive a single drive wheel to effect movement of the cart relative to the stand top surface. In that event, the illustrated drive wheels may instead be rollers or casters similar to those disposed in the U-channels.

In the presently preferred embodiment, a plurality of stop pins are disposed in the U-channels for engaging an edge of the cart and/or one of the ball casters to force the transfer conveyor cart to rotate rather than move linearly in the U-channel direction, as described in greater detail below, and to set the stop point at the end of rotation. Accordingly, stop pin locations SPL are defined for the 90 degrees left operation of the transfer conveyor and stop pin locations SPR are provided for the 90 degrees right operation of the transfer conveyor cart. Also provided in the presently preferred illustrated embodiment are an "IN" sensor 56 for detecting incoming work product, e.g. so that the belt 40 can be actuated and receive and properly position the work product, and an "OUT" sensor 58 for actuating a next adjacent, e.g., job, conveyor 60 (FIG. 6) to receive off-loaded work product and/or for detecting the completion of the off-load of work product. Also provided in the presently preferred embodiment are a plurality of proximity sensors/switches mounted to the top surface of the stand. In the illustrated embodiment, three proximity sensors/switches are disposed e.g., at 62, 64 and 66 for 90 degrees left operation and two further proximity sensor/switch locations at 68 and 70 (FIGS. 5A and 5B) are provided for use together with a proximity sensor/switch mounted at 66 for 90 degrees right operation and described in greater detail below. Vanes V1 and V2 or the like are provided on the bottom of the cart, adjacent side 20 of the cart 10, spaced apart in correspondence with the spacing of the proximity sensors/switches on the support 12. Thus, when the vanes V1 and V2 are disposed in correspondence with proximity sensors 62 and 64, the cart home position (FIG. 4A) is designated. When the vanes are disposed in positions corresponding to 64 and 66, the cart is designated at 90 degrees left. Similarly, the location of the vanes V1, V2 at positions corresponding to proximity sensors 68 and 70 designates a home position for a 90 degrees right operation and disposition of vanes V1 and V2 respectively at positions 66 and 68 designates a 90 degrees right position of the cart.

Figure 4A:
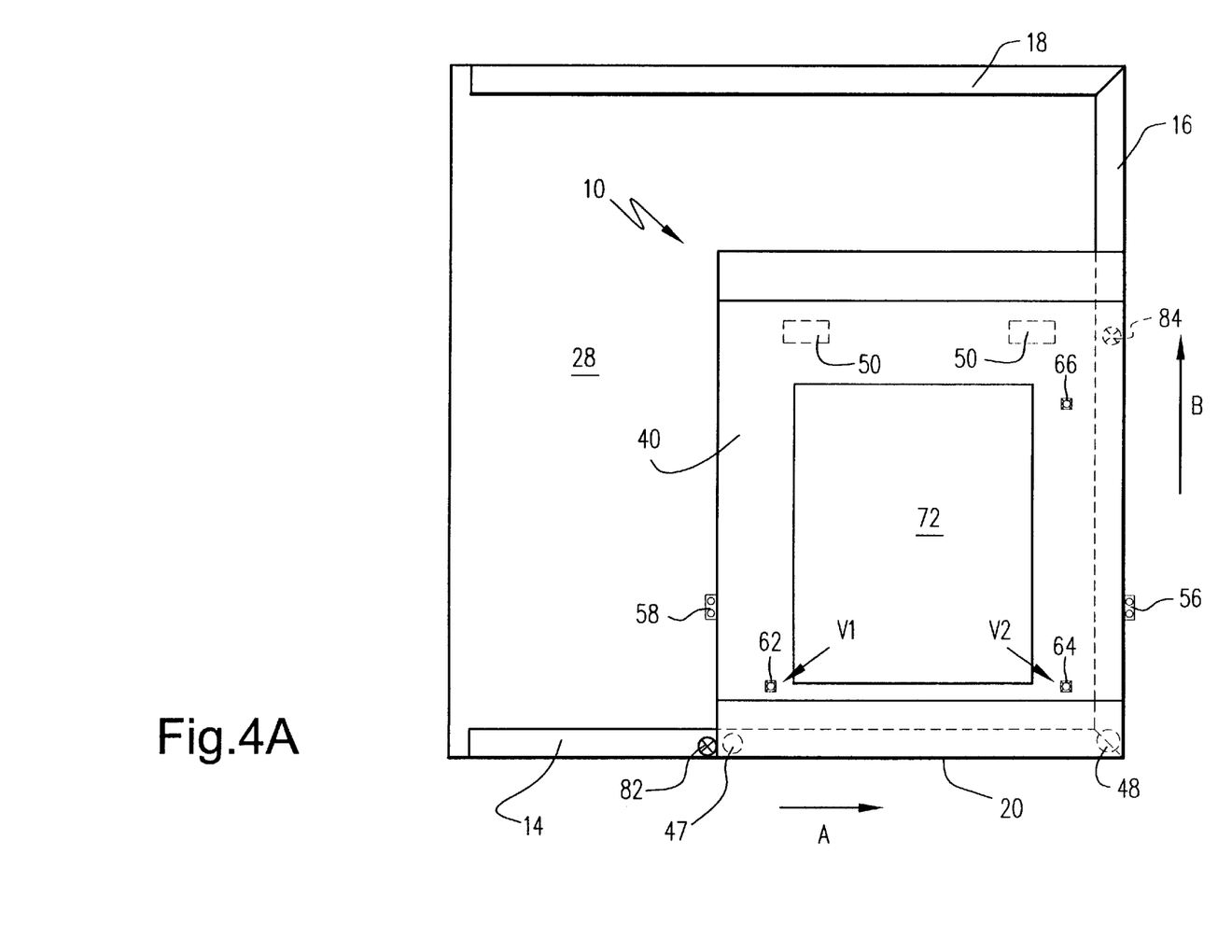
FIGS. 4A and 4B are schematic top plan views of the home and 90 degrees left positions, respectively, of a transfer conveyor adapted for 90 degrees left transfer according to an exemplary configuration of the invention.
Figure 4B:
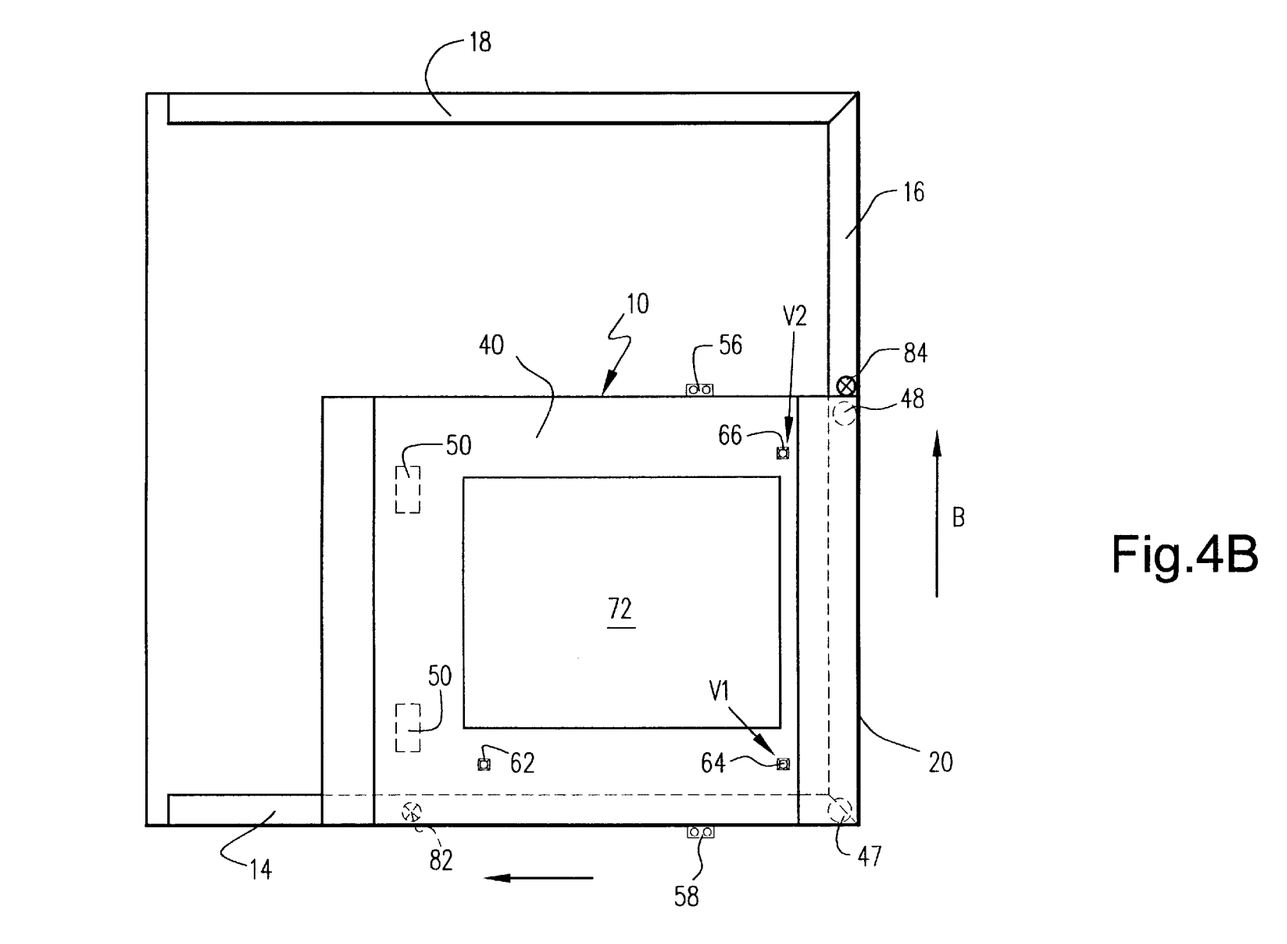

With reference to FIGS. 4A and 4B, an exemplary 90 degrees left configuration is shown with the cart drive motor omitted for clarity. In this configuration, stop pins 82, 84 are disposed at positions SPL and the first and second vanes V1, V2 disposed on the bottom of the cart are aligned with position sensors (proximity sensors) 62 and 64.

Figure 6A:
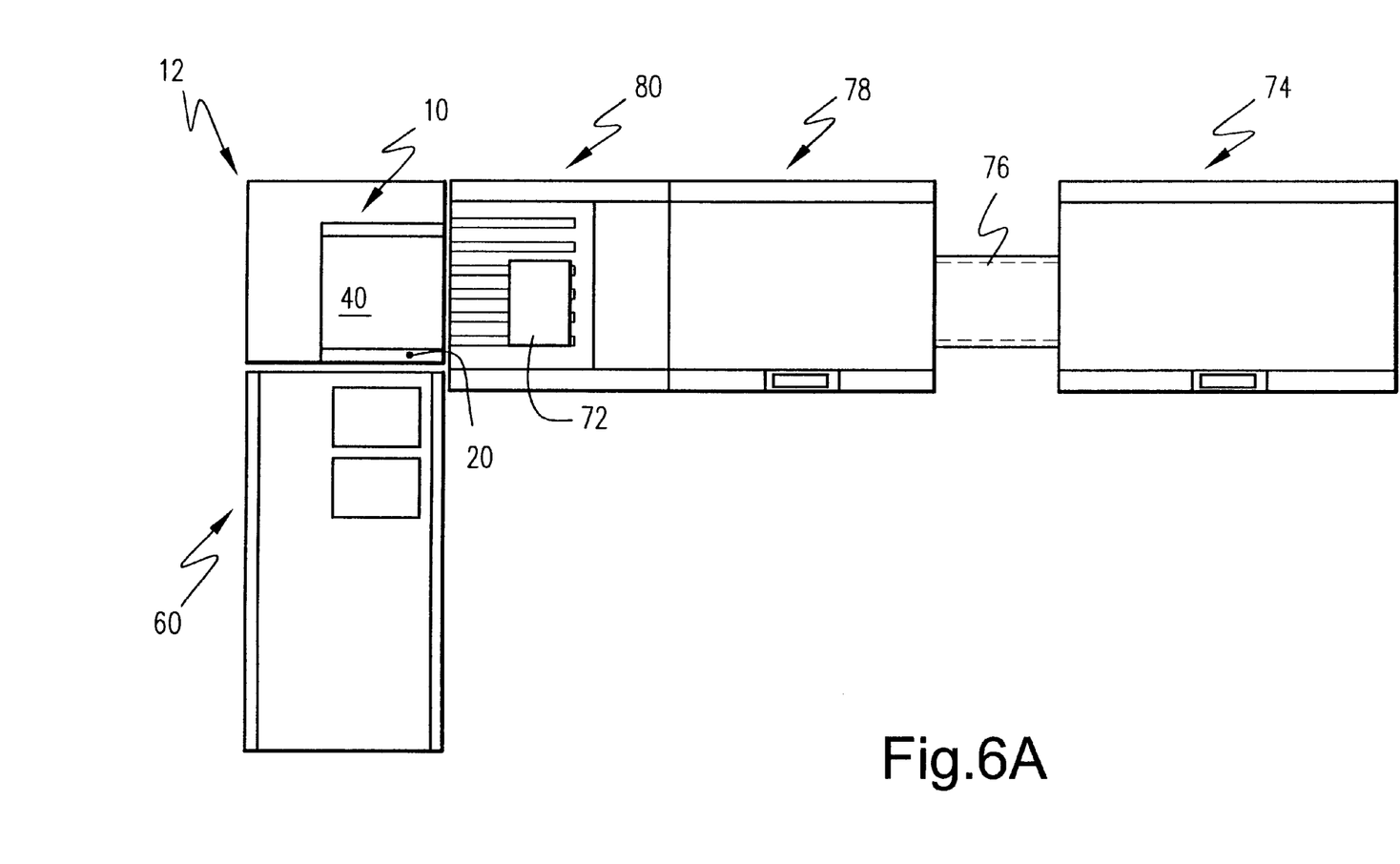
FIGS. 6A–E are sequential schematic top plan views showing a sequence of operation of a 90 degree left transfer conveyor embodying the invention.
Figure 6B:
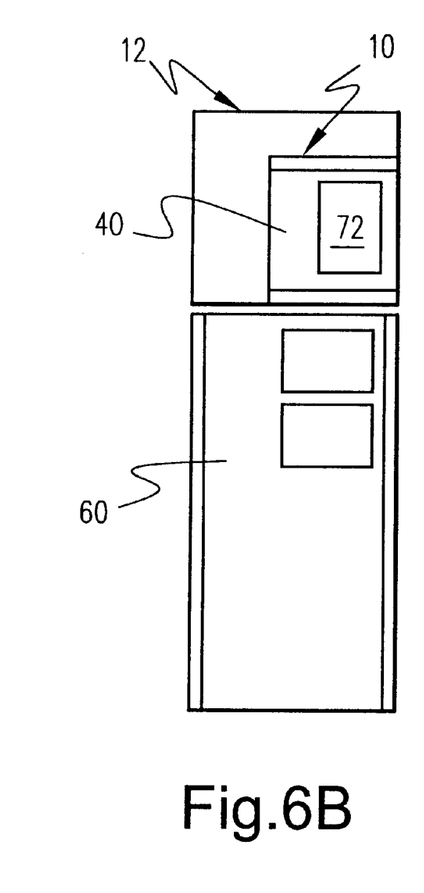

With reference to FIG. 6A in a typical operation, incoming work product is printed at a printer 74, continuously fed as a paper web 76 to a cutter 78 whereupon the cut sheets are received by a stacker 80 to define a stack 72. In the illustrated embodiment, a 90 degree left conveyor cart 10 is disposed on the stand at the output of the stacker, to the left of FIG. 6A for disposing the stack on a job conveyor 60. As the stack 72 approaches the 90 degree conveyor cart 10 as shown in FIG. 6A, the stacker module 80 of the cutter system indicates an off-load of a stack of cut sheets. When the leading edge of the stack is detected by the IN sensor 56, the belt motor 46 is switched on. The belt 40 speed is desirably adjustable to match the speed of the stacker off-load belts, either manually or automatically. When the trailing edge of the stack is detected by the IN sensor 56, the belt motor is switched off so that the cut sheets are disposed as shown in FIG. 4A.

Figure 6C:
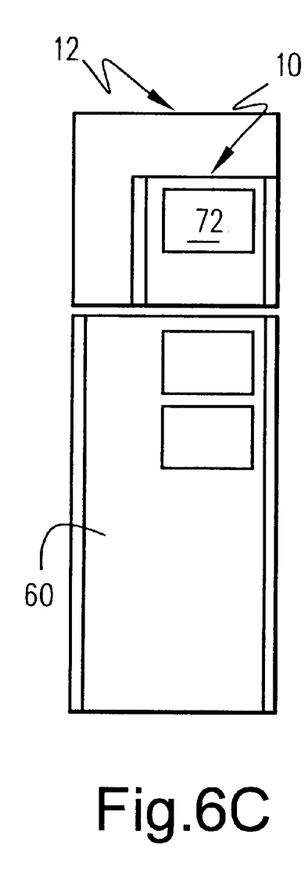
Figure 6D:
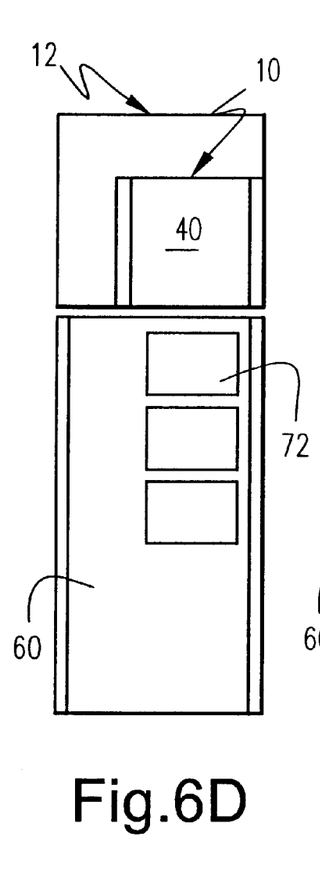

The cart motor 52 is then switched on in the forward direction so that the drive wheels 50 rotate in a clockwise direction as shown in the configuration of FIG. 2. Thus, the cart tries to move to the left as shown in FIG. 4A. Because stop pin 82 precludes movement of the one side 20 of the cart, the bottom edge in the orientation shown in FIG. 6A, the cart will begin to rotate in a counterclockwise manner so that caster 47 moves in direction A in U-shaped channel 14 and caster 48 moves in direction B in U-shaped channel 16. Thus, the cart continues to rotate in a counterclockwise manner in plan view until the cart is disposed in the position shown in FIG. 4B. At this point, pin 84 precludes further movement of the cart 10 in the counterclockwise direction. and the stack 72 of cut sheets is aligned with the job conveyor 60 as shown in FIG. 6C. When this rotation has been completed and both cart vane V1 and vane V2 are detected by proximity sensors 64 and 66, showing that the 90 degree position has been reached, the cart motor 52 is switched off. The belt motor 46 is then switched on to transfer the stack 72 to the job conveyor 60. Advantageously, a relay contact closure provides a signal to the job conveyor 60 to enable the drive belts of the job conveyor. This relay contact closure may be linked to detection of the leading edge of the stack 72 by the OUT sensor 58. When the OUT sensor detects the trailing edge of the stack 72, the belt motor 46 is switched off and after a short time delay, the relay contact is opened to stop the job conveyor 60. Such a time delay is also advantageously provided with respect to the IN sensor 56 so that the stack 72 is appropriately located on the transfer cart 10 when it is received from the stacker 80.

Figure 6E:
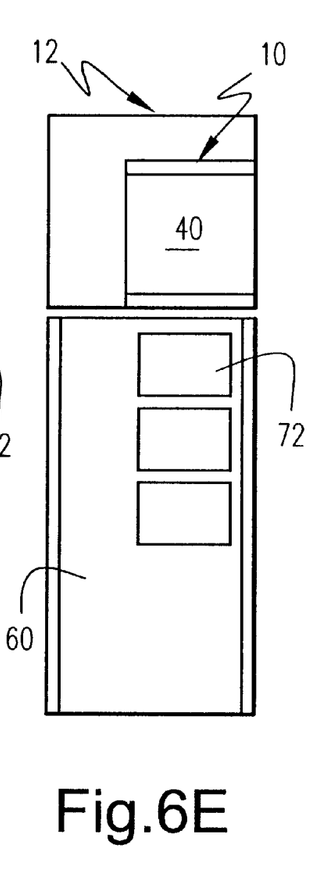

Once the stack 72 has been off-loaded, the cart motor 52 is switched on in the reverse direction so as to rotate the drive wheels in a counterclockwise direction as shown in FIG. 2. Because pin 84 precludes movement of the cart in direction B, as shown in FIG. 4B, the cart will begin to rotate in a clockwise direction so that ball caster 47 is received in channel 14 and ball caster 48 will begin to travel in U-shaped channel 16 towards the U-shaped channel intersection. When both cart vane V1 and cart vane V2 are detected by proximity sensors 62 and 64, the home position has been reached and the cart motor 52 is switched off. At this point, also, pin 82 precludes further movement of the cart in a clockwise rotation. The cart will thus be disposed as shown in FIG. 6E, ready to receive a subsequent stack of printed and cut sheets or other work product, as also shown in FIG. 6A.

As presently proposed, the transfer conveyor cart is adapted for use with the 8850 Cutter System in which product flows from right to left as shown in FIG. 6A. Thus, the most likely and presently preferred orientation for a 90-degree job conveyor is to the left as described hereinabove. Desirably, therefore, the default configuration of the 90 degree conveyor is 90 degrees left. The illustrated structure can, however, readily be converted from 90 degrees left operation to a 90 degrees right configuration.

Figure 5A:
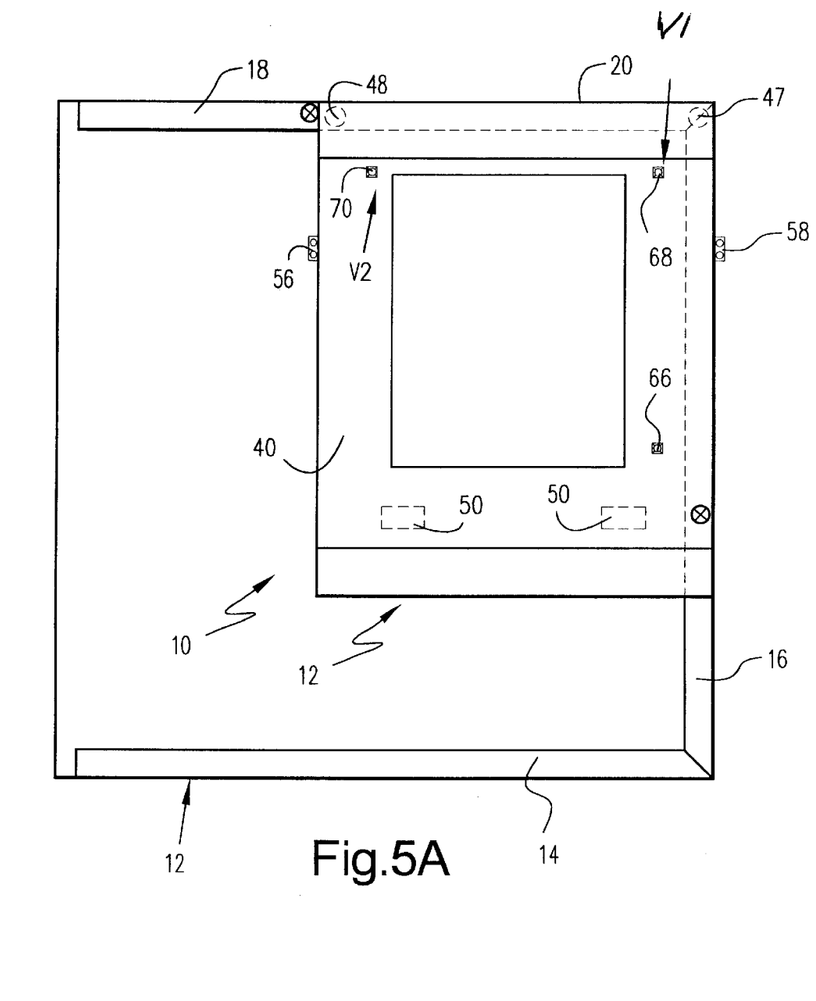
FIGS. 5A and 5B are schematic top plan views of the home and 90 degrees right positions, respectively, of a transfer conveyor adapted for 90 degrees right transfer according to an alternate configuration of the invention.
Figure 5B:
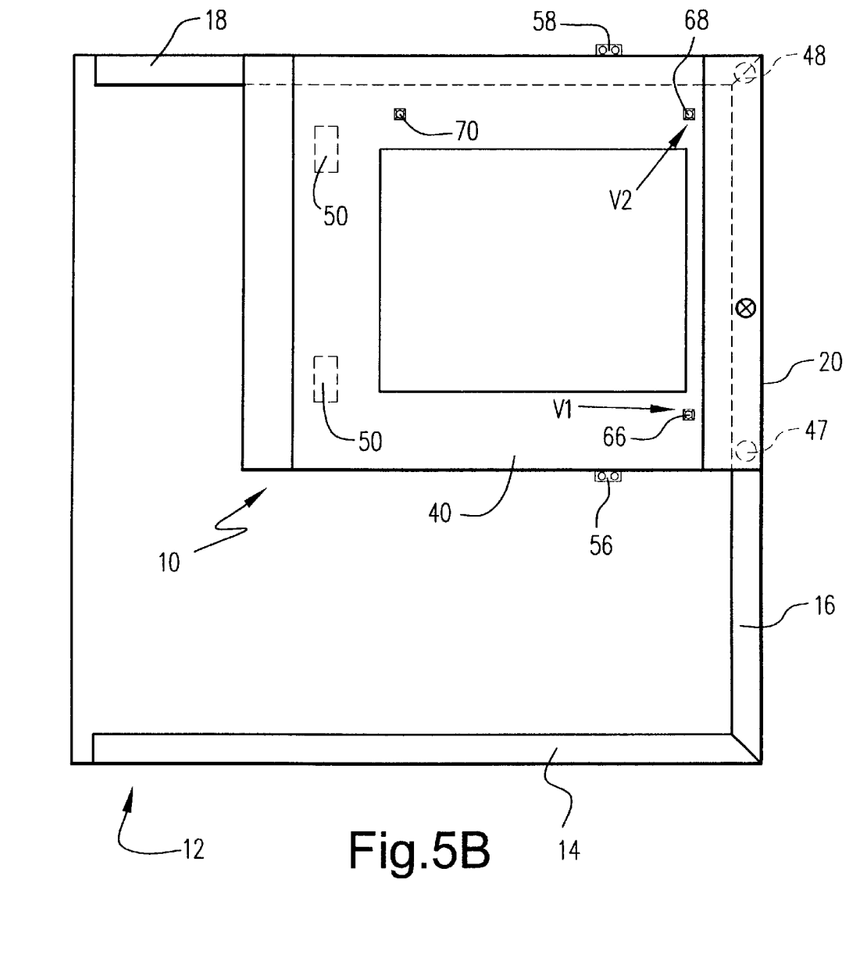

The conversion from 90 degrees left to 90 degrees right can be best understood with reference to FIG. 1, FIG. 4A, and FIG. 5A. In an exemplary embodiment, to convert from 90 degrees left to 90 degrees right configurations, the stop pins are moved from positions SPL to positions SPR. To do this, the cart 10 may be lifted out of the U-channels 14,16,18. The cart may then be placed elsewhere on the work surface 28 of the support table 12 and moved as needed to access the components which must be moved or adjusted for 90 degree right configuration. Thus, in the illustrated configuration, the two stop pins 82,84 are moved from positions SPL to positions SPR as noted above. For a 90 degree right operation, the proximity sensors provided at 62 and 64 in FIG. 4A are moved from the locations shown therein to the locations 68 and 70 shown in FIG. 5A.

As can be seen from a comparison of FIG. 4A and FIG. 5A, the cart is then rotated 180 degrees with respect to its 90 degrees left home position and located with the guide components or ball casters 47,48 in the U-channel 18. Finally, inside the electrical enclosure 38 (FIG. 3) an orientation select jumper (not shown) is changed from left to right. This will automatically reverse the cart motor 52 direction and the IN/OUT sensors 56,58 for proper operation in the 90 degree right configuration. The operation of the transfer conveyor cart in the 90 degrees right configuration is analogous to the operation in the 90 degrees left configuration, as would be apparent from an examination of FIG. 5A and FIG. 5B. As noted above, the stops are provided to force the transfer conveyor cart to rotate rather than move linearly in the U-channel direction and set the stop point at the end of rotation. In the exemplary embodiment described above, the stops are in the form of stop pins 82,84 that are selectively placed at points SPL and points SPR to define the 90 degree left and 90 degree right configurations. As an alternative to interchangeable pins, however, engagement/ actuation of the stops can be controlled, e.g., with solenoids. Similarly, the proximity sensors can be actuated/deactuated as needed rather than moved as aforesaid.

Figure 7A:
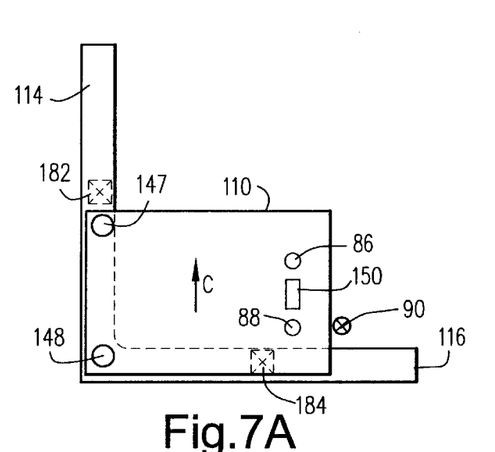
FIGS. 7A–C are schematic plan views showing a three way transfer unit embodying the invention.
Figure 7B:
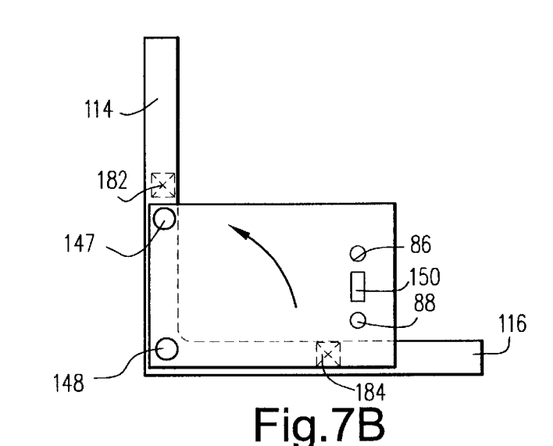
Figure 7C:
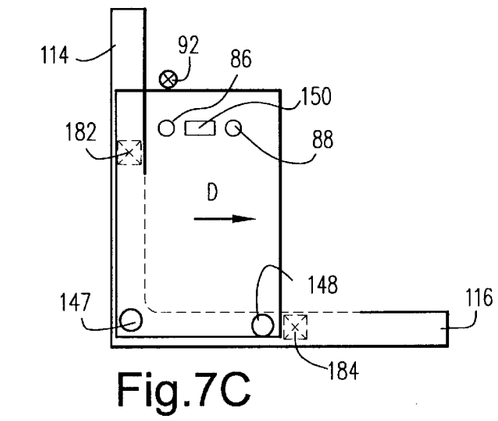

As shown in FIGS. 7A, 7B and 7C, by replacing wheels 50 with a direct drive wheel 150 and two guide rollers 86,88, by providing selectively actuatable cart guides 90, 92, and by controlling engagement of the stops 182, 184 with guides 147, 148 using solenoids, a unit can be configured for selective three-way transfer. More specifically, with reference to FIG. 7A, a first guide 90 is provided to selectively force a linear rather than rotary transfer of the transfer conveyor cart 110. For a straight out transfer, stop 182 is disengaged, guide 90 is engaged and the drive wheel 150 is enabled in the clockwise direction to move the transfer cart out in direction C in FIG. 7A and in the counterclockwise direction to return to the home state.

Transfer 90 degrees left is accomplished as described hereinabove if stop 182 and stop 184 are engaged and guide 90 is disengaged, as shown in FIG. 7B. For 90 degree right operation, first the transfer conveyor cart can be rotated 90 degrees left as shown in FIG. 7C and then stop 184 is disengaged and guide 92 is engaged to control the direction of travel of the transfer conveyor cart. The drive wheel(s) are then rotated in a counterclockwise direction to move the conveyor cart to the right, as shown by arrow D in FIG. 7C. Suitable stops (not shown) can be provided to limit movement of the transfer conveyor cart 110 in direction D. As is apparent from FIGS. 7A–C, an L-shaped U-channel 114, 116 is sufficient to accommodate this three-way transfer. As a further alternative, however, a full U-shaped U-channel may be provided with suitable stops and guides to effect similar motion as shown in FIG. 7A–C in the right corner of the track. As yet a further alternative, again with suitable guides and stops, U-channels can be provided about the entire periphery of the support stand for universal transfer.

Figure 8:
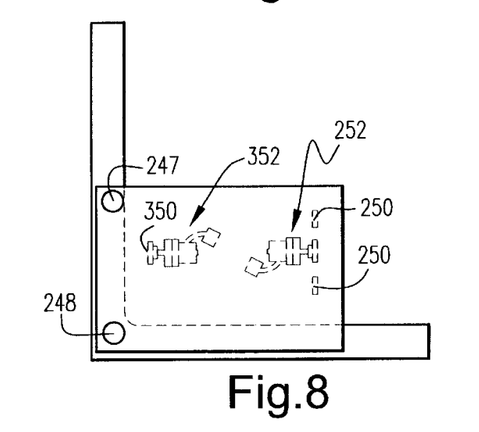
FIG. 8 is a schematic plan view of an alternate three way transfer unit in accordance with the invention.

FIG. 8 shows another way in which a 3-way transfer may be accomplished, without stops or guides, by adding a second gear motor 352 and drive wheel 350. To drive the cart 210 straight out, motor 252 is operated to rotate the drive wheels 250 in a clockwise direction while motor 352 is operated in a counterclockwise direction. Conversely, to return the cart 210 to the home position, motor 252 is operated in a counterclockwise direction while motor 352 is operated in a clockwise direction. To rotate the transfer cart 90 degrees left, both motors 252, 353 are rotated in a clockwise manner. Conversely to return to the home position, both motors are rotated in a counterclockwise direction. To move the transfer cart 210 straight to the right from the 90 degrees left orientation. Motor 252 is operated in a counterclockwise manner and motor 352 is operated clockwise. Conversely to return the transfer cart 210 straight left, motor 252 is operated in a clockwise manner while motor 352 is operated in a counterclockwise manner. In the embodiment illustrated in FIG. 8, the second motor 352 is provided with a single drive gear or wheel 350 as the wheels 250 associated with the first motor 252 and the ball casters 247, 248 maintain the transfer conveyor cart in a horizontal disposition.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-direction transfer conveyor assembly comprising:

a support stand including a top support surface and having at least first and second track segments disposed adjacent and generally parallel to first and second side edges of said top surface of said stand and intersecting to define a generally L-shaped track on said top surface of said stand, each said track segment being generally U-shaped in vertical cross-section to define a respective generally U-shaped channel; and a transfer conveyor cart disposed on said top surface of said stand said cart including first and second guide components proximate a first edge thereof and sized so as to be received in the U-shaped channel of a said track segment, a first drive wheel assembly remote from said first side edge for selectively moving said cart with respect to said top surface, and a conveyor structure being provided on a top surface of said cart for conveying work product onto and off of said cart, wherein movement of said cart with respect to said top surface is limited by engagement and movement of said guide components within said U-shaped channels of said track segments.

2. A multi-direction transfer conveyor assembly as in claim 1, further comprising at least first and second stop structures for selectively limiting displacement of at least one of said guide components with respect to a said track section to determine a movement end position of said cart with respect to said top surface of said stand.

3. A multi-direction transfer conveyor assembly as in claim 1, further comprising a second drive wheel assembly disposed between said guide components and said first drive wheel assembly, selective actuation of each said drive wheel assembly in respective clockwise and counterclockwise directions determining a movement of said cart with respect to said top surface of said stand.

4. A multi-direction transfer conveyor assembly as in claim 1, wherein said first drive wheel assembly comprises first and second drive wheels commonly driven by a single drive motor.

5. A multi-direction transfer conveyor assembly as in claim 1, wherein said guide components comprise guide rollers.

6. A multi-direction transfer conveyor assembly as in claim 1, wherein said first drive wheel assembly includes at least one drive wheel and at least two ball casters.

7. A multi-direction transfer conveyor assembly as in claim 1, wherein said conveyor structure comprises a belt conveyor and wherein the cart includes a belt drive motor for selectively driving said belt conveyor.

8. A multi-direction transfer conveyor assembly as in claim 1, further comprising a sensor structure provided adjacent at least one longitudinal end of said conveyor for selectively detecting work product fed towards and onto said cart and away and off of said cart.

9. A multi-direction transfer conveyor assembly as in claim 1, further comprising at least one guide structure for selectively confining said cart to linear movement with respect to said stand.

10. A multi-direction transfer conveyor assembly as in claim 1, further comprising at least one proximity sensor disposed on a top surface of said stand for selectively detecting a corresponding proximity component provided on a bottom surface of said cart.

11. A work product processing and conveying system comprising:

a printer;

a stacker for cutting and stacking a continuous web received from said printer;

a stacked product conveyor; and a transfer conveyor for receiving stacked work product from said stacker and transferring said work product to a stacked product conveyor, said transfer conveyor comprising:

a support stand including a top support surface and having at least first and second track segments disposed adjacent and generally parallel to first and second side edges of said top surface of said stand and intersecting to define a generally L-shaped track on said top surface of said stand, each said track segment being generally U-shaped in vertical cross-section to define a respective generally U-shaped channel; and a transfer conveyor cart disposed on said top surface of said stand said cart including first and second guide components proximate a first edge thereof and sized so as to be received in the U-shaped channel of a said track segment and a first drive wheel assembly remote from said first side edge for selectively moving said cart with respect to said top surface, movement of said cart with respect to said top surface being limited by engagement and movement of said guide components within said U-shaped channels of said track segments, a conveyor structure being provided on a top surface of said cart for conveying work product onto and off of said cart.

12. A work product processing and conveying system as in claim 11, further comprising at least first and second stop structures for selectively limiting displacement of at least one of said guide components with respect to a said track section to determine a movement end position of said cart with respect to said top surface of said stand.

13. A method of conveying work product from a first, product supply structure to a second, product receiving structure comprising:

providing a support stand, said support stand including a top support surface and having at least first and second track segments disposed adjacent and generally parallel to first and second side edges of said top surface of said stand and intersecting to define a generally L-shaped track on said top surface of said stand, each said track segment being generally U-shaped in vertical cross-section to define a respective generally U-shaped channel, and first and second stop structures;

providing a transfer conveyor cart, said transfer conveyor cart including first and second guide components proximate a first edge thereof and sized so as to be received in the U-shaped channel of a said track segment, a first drive wheel assembly remote from said first side edge and including at least one drive wheel for selectively moving said cart with respect to said top surface, and a conveyor structure being provided on a top surface of said cart for conveying work product onto and off of said cart, movement of said cart with respect to said top surface being limited by engagement and movement of said guide components within said U-shaped channels of said track segments;

disposing said transfer conveyor cart on said top surface of said stand;

aligning a first side edge of said transfer conveyor cart and a corresponding edge of stand in opposed facing relation to an exit edge of said supply structure;

a detecting a feed of work product towards the transfer conveyor cart;

actuating said conveyor structure of said transfer conveyor cart to receive said work product on said transfer conveyor cart;

de-actuating said conveyor structure;

actuating said first drive wheel assembly to rotate said drive wheel to rotate in a first direction so as to initiate motion of said cart; engagement of at least one of said cart and said first guide component with said first stop structure causing said cart to initiate a rotation in one of a clockwise and a counterclockwise direction until a second edge of said cart is aligned in opposed facing relation to said receiving structure and engagement of at least one of said cart and said second guide component with said second stop structure precludes further rotation of said cart;

de-actuating said first drive wheel assembly;

actuating said conveyor structure to offload said work product to said receiving structure; and de-actuating said conveyor.

14. A method of conveying work product as in claim 13, further comprising actuating said first drive wheel assembly to rotate said drive wheel in a second direction opposite to said first direction, to return said first side of said cart to opposed facing relation to said product supply structure.

* * * * *